US005219504A

United States Patent [19]

Insley

[11] Patent Number: 5,219,504

[45] Date of Patent: Jun. 15, 1993

[54] METHOD OF MAKING SORBENT, IMPACT RESISTANT CONTAINER

[75] Inventor: Thomas I. Insley, Lake Elmo, Minn.

[73] Assignee: Minnesota Mining and Manufacturing Company, St. Paul, Minn.

[21] Appl. No.: 664,526

[22] Filed: Mar. 5, 1991

Related U.S. Application Data

[63] Continuation of Ser. No. 593,308, Oct. 2, 1990, Pat. No. 5,024,865, which is a continuation of Ser. No. 335,202, Apr. 7, 1989, abandoned.

[51] Int. Cl.$^5$ .............................................. B29C 43/02

[52] U.S. Cl. .................................... 264/116; 264/109; 264/123

[58] Field of Search ............... 264/115, 116, 123, 122, 264/109

[56] References Cited

U.S. PATENT DOCUMENTS

| | | | |
|---|---|---|---|
| Re. 24,767 | 1/1960 | Simon et al. | 206/46 |
| 2,929,425 | 3/1960 | Slaughter | 150/1 |
| 2,941,708 | 6/1960 | Crane et al. | 229/2.5 |
| 3,309,893 | 3/1967 | Heffler et al. | 62/372 |
| 3,698,587 | 10/1972 | Baker et al. | 220/9 F |
| 3,895,159 | 7/1975 | Yoshimura | 428/227 |
| 3,971,373 | 7/1976 | Braun | 128/146.2 |
| 3,981,100 | 9/1976 | Weaver et al. | 47/58 |
| 3,999,653 | 12/1976 | Haigh et al. | 206/584 |
| 4,100,324 | 7/1978 | Anderson et al. | 428/288 |
| 4,118,531 | 10/1978 | Hauser | 428/224 |
| 4,124,116 | 11/1978 | McCabe, Jr. | 206/204 |
| 4,191,726 | 3/1980 | Stillhard et al. | 264/123 |
| 4,213,528 | 7/1980 | Kreutz et al. | 206/205 |
| 4,240,547 | 12/1980 | Taylor | 206/204 |
| 4,426,417 | 1/1984 | Meitner | 428/195 |
| 4,429,001 | 1/1984 | Kolpin et al. | 428/283 |
| 4,481,779 | 11/1984 | Barthel | 62/48 |
| 4,495,775 | 1/1985 | Young et al. | 62/48 |
| 4,560,069 | 12/1985 | Simoa | 206/991 |
| 4,584,822 | 4/1986 | Fielding et al. | 53/452 |
| 4,756,937 | 7/1988 | Mentzer | 428/365 |
| 4,813,948 | 3/1989 | Insley | 604/366 |
| 4,865,789 | 12/1989 | Castro et al. | 264/122 |
| 5,024,865 | 6/1991 | Insley | 428/36.4 |

OTHER PUBLICATIONS

Wente, Van A., "Superfine Thermoplastic Fibers", Industrial Engineering Chemistry, vol. 48, pp. 1342–1346.

Wente, Van A. et al., Manufacture of Superfine Organic Fibers, Report No. 4364, Naval Research Laboratories, published May 25, 1954.

Shock Control, Arimond, John, Machine Design, May 21, 1987.

*Primary Examiner*—Mary Lynn Theisen

*Attorney, Agent, or Firm*—Gary L. Griswold; Walter N. Kirn; Carole Truesdale

[57] ABSTRACT

An article comprising compressed particles of polyolefin microfibers is provided. The article has a solidity of at least 20% is particularly suitable as a container for shipping and storing hazardous liquid materials or a cryogenic container.

6 Claims, 2 Drawing Sheets

METHOD OF MAKING SORBENT, IMPACT RESISTANT CONTAINER

This is a continuation of application Ser. No. 593,308, filed Oct. 2, 1990, now U.S. Pat. No. 5,024,865, which is a continuation of application Ser. No. 335,202, filed Apr. 7, 1989, now abandoned.

BACKGROUND OF THE INVENTION

1. Field of the Invention

The present invention relates to a container which is useful for shipping and storing hazardous fluid materials.

2. Background Information

The shipment of hazardous fluid materials requires the use of a shipping container or package which will protect the vessel holding the material from shock which can cause breakage as well as provide for containment or control of the fluid material should the vessel be broken. The shock protection and containment requirements are generally incompatible in that materials which provide good shock protection typically exhibit poor fluid containment or absorption properties and materials having good fluid containment or absorption properties exhibit poor shock protection properties. Hazardous fluid material shipping containers which offer both shock and containment protection which have evolved are a combination of a more rigid container which provides shock protection that is filled with an absorbent material. This combined structure results in a shipping package that is very large relative to the volume of hazardous material being shipped in the package.

U.S. Pat. No 4,560,069 (Simon) discloses a package assembly for transporting hazardous materials including a bottle containing the hazardous material disposed within a metal can wherein the bottle is surrounded on all sides by individual upper, lower and side absorbent non-resilient and frangible synthetic foam elements. The foam elements provide cushioning for the bottle and absorbency in the case of spillage. The individual foam elements are maintained out of contact with each other by means of a fiberboard spacers. The spacers are disposed to separate the upper and lower ends of the bottle from the resin foam and to protect the frangible foam from disintegration due to abrasion by the bottle. The metal can can be suspended within an outer corrugated fiberboard box by means of a fiberboard insert element for the outer box. The fiberboard insert element supports the can out of contact with the outer fiberboard box and provides a protecting buffer zone between the can and the walls of the outer fiberboard box for protection of the can.

U.S. Pat. No 3,999,653 (Haigh et al.) discloses a package containing a hazardous liquid which comprises a container which is generally impermeable to a hazardous liquid contained therein, the container being subject to discharge of its contents when subjected to impact. The container is disposed within a first jacket of a liquid permeable material of sufficient strength to contain fragments of the container on rupture thereof A second jacket is provided over the first jacket, the second jacket having at least an inner wall and outer wall, the inner wall being liquid permeable, a hazardous liquid swellable body contained between the inner wall and outer wall and being generally co-extensive with the inner wall and outer wall, and a third jacket of hazardous liquid vapor imperious membrane.

U.S. Pat. No. 4,213,528 (Kreutz et al ) discloses a package for an acid container, such as an acid containing ampule or bottle, formed of an acid resistant envelope and a separate removable absorbent shield for enclosing the acid container, with the absorbent shield including a material to neutralize acid whereby any acid released from the container is absorbed and neutralized by the absorbent shield. The absorbent shield is generally porous, yet sufficiently absorbent to allow essentially instantaneous absorption of acidic liquids of high, medium and low viscosities.

U.S. Pat. No Re 24,767 (Simon et al.) discloses a packaging container that provides uniform thermal, shock, impact, vibration, inertia and fluid impervious insulation for a fragile or delicate object or material. The object or material is completely encased in a yielding, flexible and resilient cellular or foamaceous sheath of selected thickness that is effective as a protection against shock, impact, vibration, inertia effects, etc as well as being a good thermal insulating blanket, the sheath cradling and supporting the object or material, and a fluid-tight or impervious shell to protect the object or material against deterioration by temperature changes or moisture.

U.S. Pat. No. 2,929,425 (Slaughter) discloses a protective pouch comprising an elongated cushioning strip having a series of pockets into which parts to be packaged may be inserted. The pouch is so constructed that one or more of the longitudinal edges of the cushioning strip may be folded over the pockets to cover them, and then the pouch is either rolled up or folded up for insertion into a shipping container such as a metal can, a wooden box or a carton.

U.S. Pat. No. 2,941,708 (Crane et al.) discloses a molded pulp set-up insulating container in which six integrally joined sections have rims disposed thereon to give locking contact where free section edges meet. The container is molded so as to have the minimum amount of pulp in direct contact with the goods held in the container to minimize heat transfer through the pulp. The container has sufficient rigidity to support the goods within the container and to also entrap a blanket of insulating air around the goods.

U.S. Pat. No. 3,309,893 (Heffler et al ) discloses an insulated shipping container which has an elongated body, quadrilateral in cross section, formed of a rigid, inflexible polyurethane foam, having a heat-conductivity factor in the range of 0.11 to 0.20 and integrally provided with a cavity of circular cross section opening at one end of the body and being closed at its other end and a closure for the cavity being of cylindrical form and having a diameter greater than that of the cavity and formed of resilient, flexible, and porous polyurethane foam for sealing engagement within the open end of the cavity for forming a tight joint with the walls thereof while permitting the escape of gases from within the container and having a heat conductivity factor in the range of 0.22 to 0.35.

U.S. Pat. No. 3,698,587 (Baker et al ) discloses a self-sealing wall for containers and conduits comprising a substantially rigid supporting layer of liquid impervious material, a layer of foam and at least one layer of a homogeneous elastomeric polyurethane adhered to the foam.

U.S. Pat. No. 3,895,159 (Yoshimura) discloses a cryogenic insulation material which is shaped in conformance with the the form of an article to be insulated and is made of a rigid polyurethane foam having a core layer including cells and inner and outer surface layers including hardly any cells Glass fiber is embedded at least in the inner surface layer U.S. Pat. No. 4,124,116 (McCabe, Jr.) discloses a liquid absorbing sectional pack consisting of upper and lower filter sheets bonded to each other at the outermost contiguous edges to form an enclosure. The enclosure is divided into a plurality of sectional compartments which are isolated from each other by dissolving barrier sheets. The dissolving barrier sheets consist essentially of a water soluble carboxy methyl cellulose compound. Each of the sectional compartments contain a predetermined quantity of absorbent granules The barrier sheets function to dissolve when the granules have absorbed a predetermined amount of moisture so as to provide for increased space in which to contain moist granules.

U.S. Pat. No. 4,240,547 (Taylor) discloses a compact, reusable specimen mailer for safely shipping fragile specimen containers via the postal service Two substantially identical L-shaped matable parts are each provided with a long leg having a flat free end and a flat inside face, and a short leg having a flat inside face, so that the two parts may be joined together with the free end of the long legs of the two parts flush against each other. Typically, the long leg of each part forms apertures for receiving test tubes, which protrude from the free end of the long leg of the other part. Also typically, the long leg forms an aperture opening out of its free end and its inside face, and connected with another cavity formed in the inside face of the short leg, for receiving a slide holder. A sheet of absorbent material is disposed within a recess in the inside face of the long leg for absorbing leaking fluids. The two parts are joined together and placed in a special envelope for mailing.

U.S. Pat. No. 4,481,779 (Barthel) discloses a storage container for shipping transportable materials at cryogenic temperatures including a vessel which opens to the atmosphere and contains a micro-fibrous structure for holding a liquefied gas such as liquid nitrogen in adsorption and capillary suspension The micro-fibrous structure comprises a core permeable to liquid and gaseous nitrogen and an adsorption matrix composed of a web of inorganic fibers surrounding the core in a multilayered arrangement U.S. Pat. No. 4,495,775 (Young et al ) discloses a container for shipping transportable materials at cryogenic temperatures including a vessel which opens to the atmosphere and contains a micro-fibrous structure for holding a liquefied gas such as liquid nitrogen in adsorption and capillary suspension. The micro-fibrous structure comprises a core permeable to liquid and gaseous nitrogen and an adsorption matrix composed of randomly oriented inorganic fibers surrounding the core as a homogeneous body in stable confinement.

U.S. Pat. No. 4,584,822 (Fielding et al.) discloses a cushion packing material for use in protecting objects from shock and vibrational loads. The cushion packing comprises a dimensionally stable thermoformed shell forming a chamber therein of a predetermined configuration and having a foam material, preferably low density polyurethane foam, disposed therewithin so as to provide a molded density of less than or equal to 1.5 pounds per cubic foot.

SUMMARY OF THE INVENTION

The present invention, in one aspect, provides an article comprising compressed particles comprising polyolefin microfibers, said article having a solidity of at least 20%

The present invention, in another aspect, provides a container comprising a shaped article of compressed particles of polyolefin microfibers, said article having a solidity of at least about 20%. The container is absorbent, impact resistant and thermally insulating. Preferably, the container is enclosed in an impermeable protective outer layer. Particulate and other fibrous material can also be incorporated in the compressed particles of polyolefin microfiber structure. The container has excellent structural rigidity, impact resistance, and compression resistance and provides both excellent cushioning properties and excellent sorbency.

The container is particularly useful for storing and transporting hazardous liquid materials such as acidic materials, caustic materials, and biological fluids, particularly when such materials are packaged in breakable vessels. Generally, the preferred material for containment of hazardous liquid materials are rigid breakable materials such as glass or high density thermoplastic materials such as polyolefin, polycarbonate or polyester in the form of jars, bottles, vials, or test tubes. In handling and shipping, such vessels are susceptible to breakage through impact. Breakage of the vessel creates the potential for contamination of the surrounding environment and the potential human risk associated in contacting the contaminated broken vessel and its contents. The excellent cushioning and sorbency properties of the containers of this invention provide an excellent means for safely storing and shipping hazardous liquid materials in breakable vessels.

The container of the present invention is also useful for storing and shipping materials under cryogenic conditions.

The container of the present invention also can provide excellent thermal insulation for vessels stored and shipped in the containers.

The present invention, in a further aspect, provides a process for preparing the compressed particles of polyolefin microfiber article of the present invention comprising providing particles of polyolefin microfibers to a mold, applying pressure to said particles, releasing said pressure, and removing said article from said mold, said pressure being sufficient to achieve a solidity of at least about 20% when said pressure is released.

The present invention, in another aspect, provides a process for preparing a container comprising providing particles of polyolefin microfibers to a mold, applying pressure to said particles to form said container, releasing said pressure, and removing said container from said mold, said pressure being sufficient to achieve a solidity of at least about 20% when said pressure is released.

DETAILED DESCRIPTION OF THE INVENTION

Figure 1:
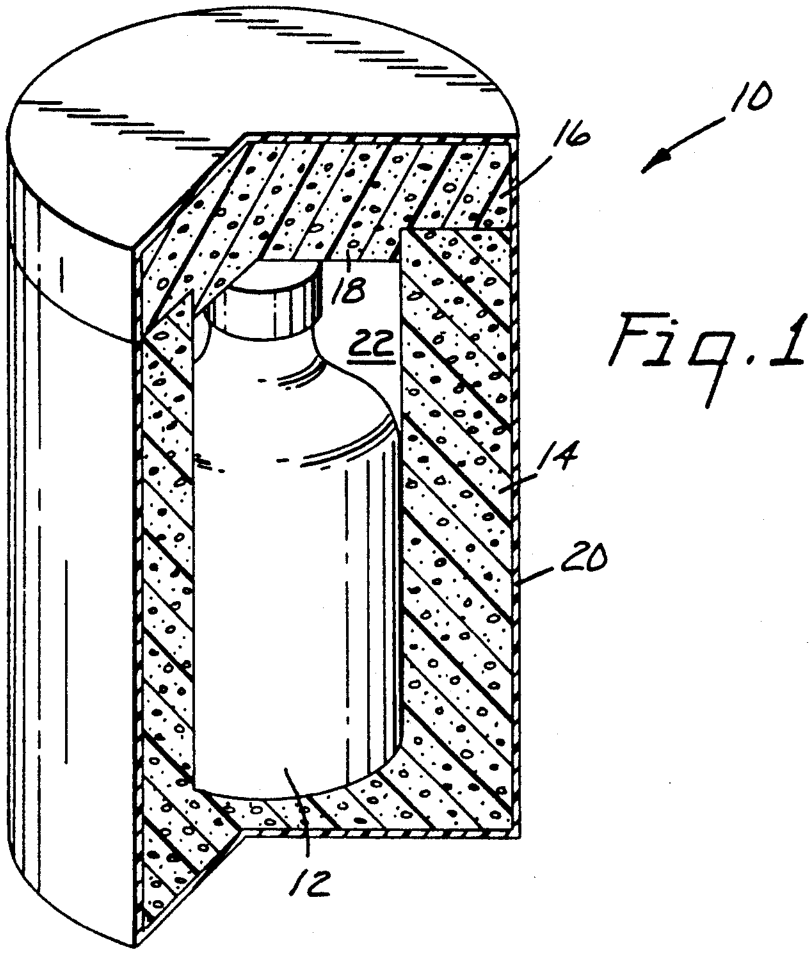
FIG. 1 is a perspective view of a container of the present invention.

The polyolefin fibers useful in the present invention can be formed from polyethylene, polypropylene, polybutylene, blends thereof and copolymers of ethylene, propylene and/or butylene. The fibers are preferably less than about 50 microns, more preferably less than about 25 microns, most preferably less than about 10 microns, in diameter. The fibers are preferably prepared by melt blowing, flash spinning, or fibrillation. Particularly preferred are blown microfibers in web form which has been milled or divellicated to form the particles of polyolefin microfibers. The particles preferably are less than about 2 cm, more preferably less than about 1 cm, most preferably less than about 0.5 cm in average diameter, although a small amount, generally less than about 5 weight percent can range in size up to about 10 cm.

The microfiber webs can be prepared, for example, as described in Wente, Van A , "Superfine Thermoplastic Fibers," Industrial Engineering Chemistry, vol. 48, pp. 1342–1346, and in Wente, Van A. et al., "Manufacture of Superfine Organic Fibers," Report No. 4364 of the Naval Research Laboratories, published May 25, 1954, or from microfiber webs containing particulate matter such as those disclosed, for example, in U.S. Pat. No. 3,971,373 (Braun), U.S. Pat. No. 4,100,324 (Anderson et al.) and U.S. Pat. No. 4,429,001 (Kolpin et al.), which are incorporated herein by reference.

The microfiber webs are then formed into particles having a size of less than about 2 cm average diameter such as by, for example, milling or divellicating. Milling can be carried out using a hammer mill, a cryogenic mill or a shredder. Divellicating can be carried out using a lickerin as described in U.S Pat. No. 4,813,948 (Insley) which is incorporated herein by reference. Such divellicating produces microwebs having a relatively dense nucleus with fibers and fiber bundles extending therefrom. The nucleus of the microfiber microwebs is preferably in the range of about 0.05 to 4 mm, more preferably about 0.2 to 2 mm. The extending fibers and/or fiber bundles preferably extend beyond the nucleus to provide an overall diameter of about 0.07 to 10 mm, more preferably about 0.1 to 5 mm.

The articles and containers of the invention are formed by compressing the particles of polyolefin microfibers, i.e., the microfiber microwebs to a solidity of at least about 20%, preferably at least about 30%. The solidity of the article or container is calculated according to the formula.

$$\% \text{ solidity} = \frac{\text{density of compressed article}}{\Sigma(\text{density of component}) \times (\text{weight fraction of component})} \times 100$$

When the solidity is less than about about 30%, the shaped article may require support, i.e., plastic casing, fiberboard box, or metal outer casing Preferably, the polyolefin fibers are compressed to a solidity of less than about 80%, more preferably less than about 70%. When the solidity is greater than about 80%, the sorbency and cushioning properties of the shipping container may be insufficient. When the polyolefin fibers are provided as microfiber microwebs, the solidity of the article is most preferably about 40 to 50% which provides a material which can be drilled or milled to the desired shape and has excellent sorbency and cushioning properties.

Compression of the particles of polyolefin microfibers can be accomplished using conventional compression molding equipment such as, for example, flash molding, or powder molding equipment at ambient conditions. Generally, pressures in the range of about 2 to 25 MPa are sufficient to achieve the desired degree of solidity. When the particles are microfiber microwebs, pressures in the range of about 5 to 10 MPa can preferably be used to achieve the preferred solidity of about 40 to 50%. Although such pressures are used to compress the particles of microfibers to form the articles of the invention, there is no significant fusing of the microfibers and no reduction in the available microfiber surface area.

The articles and containers of the invention have excellent sorbency The articles and containers preferably exhibit a demand sorbency of at least about 0.5 $l/m^2/min$, more preferably at least about 1.0 $l/m^2/min$, most preferably at least about 2.0 $l/m^2/min$. The articles and containers preferably exhibit an equilibrium sorption of at least about 0.25 $cm^3/cm^3$, more preferably at least about 0.40 $cm^3/cm^3$, most preferably at least about 0.60 $cm^3/cm^3$. The articles and containers preferably exhibit a centrifugal retention of at least about 0.15 $cm^3/cm^3$, more preferably at least about 0.20 $cm^3/cm^3$.

The articles and containers of the invention possess good mechanical properties The tensile strength of the article or container material is preferably at least about 9 KPa, more preferably at least about 20 KPa, most preferably at least about 50 KPa. The compressive strain energy of the article and container material is preferably at least about 5 $KJ/m^3$, more preferably at least about 20 $KJ/m^3$, most preferably at least about 40 $KJ/m^3$.

The containers of the invention have excellent insulation properties. The containers preferably have a thermal conductivity of less than about $1.5\times10^{-4}$ cal/cm-sec-° C., more preferably less than about $1.0\times10^{-4}$ cal/cm-sec-° C at a temperature of 76° C.

The containers of the invention can serve as containers for storing and shipping materials under cryogenic conditions when imbibed with liquid nitrogen. Preferably the outside of the container is provided with insulation to reduce evaporation of the liquid nitrogen Particulate and fibrous material can be introduced into the compressed polyolefin microfiber structure by introducing particulate or fibrous material into the microfiber web as it is being formed as described in U.S. Pat. No. 3,971,373 (Braun), No 4,118,531 (Hauser), No. 4,100,324 (Anderson et al.) and No. 4,429,001 (Kolpin et al.) which are incorporated herein by reference, or by mixing the particulate or fibrous material with the milled or divellicated microfibers prior to compression. Preferably, the particulate is introduced into the microfiber web as it is being formed.

Particulate materials useful in the present invention include, but are not limited to absorbent particulate materials, neutralizing particulate materials and catalytic agents. Preferably, the amount of particulate incorporated in the compressed microfiber structure is less than about 90 weight percent, more preferably less than about 75 weight percent, most preferably less than 50 weight percent.

Absorbent particulate materials useful with aqueous hazardous liquids include high sorbency liquid sorbent particles such as, for example, water-insoluble modified starches such as, for example, those sorbent particulates described in U.S. Pat. No. 3,981,100, and high molecular weight acrylic polymers containing hydrophilic groups. Among sorbent particulate materials useful for sorbing liquids other than water are alkylstyrene sorbent particles, such as Imbiber Beads TM, available from Dow Chemical Company Other sorbent particulate materials include wood pulp and activated carbon, the activated carbon being particularly useful for absorbing vapors which might evolve from the hazardous material.

Neutralizing particulate materials useful in the present invention include, for example, materials such as alumina, sodium carbonate, sodium bicarbonate, calcium carbonate, etc. Catalytic particulate materials which can be introduced into the compressed polyolefin microfiber structure include, for example, hopcalite and silver. Biological entities such as enzymes or microbiological species which can catalyze the conversion of a hazardous material into harmless by-products can also be incorporated into the articles and containers of the present invention.

Preferably, the container of the present invention includes an outer covering. The outer covering can be, for example, of fiberboard, metal, or thermoplastic material. The preferred outer covering material is shrinkable thermoplastic film which is well known in the art and can provide an additional, impervious layer to further ensure containment of the hazardous material.

The containers of the present invention can be molded and, optionally, milled or drilled to a wide variety of shapes such that a package of hazardous material can be safely stored or shipped in the container. The size of the container is preferably such that there is sufficient sorptive microfiber and particulate, if present, to absorb, contain, or neutralize the hazardous material with some margin of safety.

FIG. 1 shows a preferred container 10 of the invention encasing a bottle 12 of hazardous liquid. Container 10 has a lower section 14 and a lid 16, each of which are formed of compressed polyolefin microfibers. Lid 16 has a protruding portion 18 which snugly fits the cavity 22 of lower section 14 A covering of shrinkable thermoplastic film 20 is provided around the compressed polyolefin microfibers.

Figure 2:
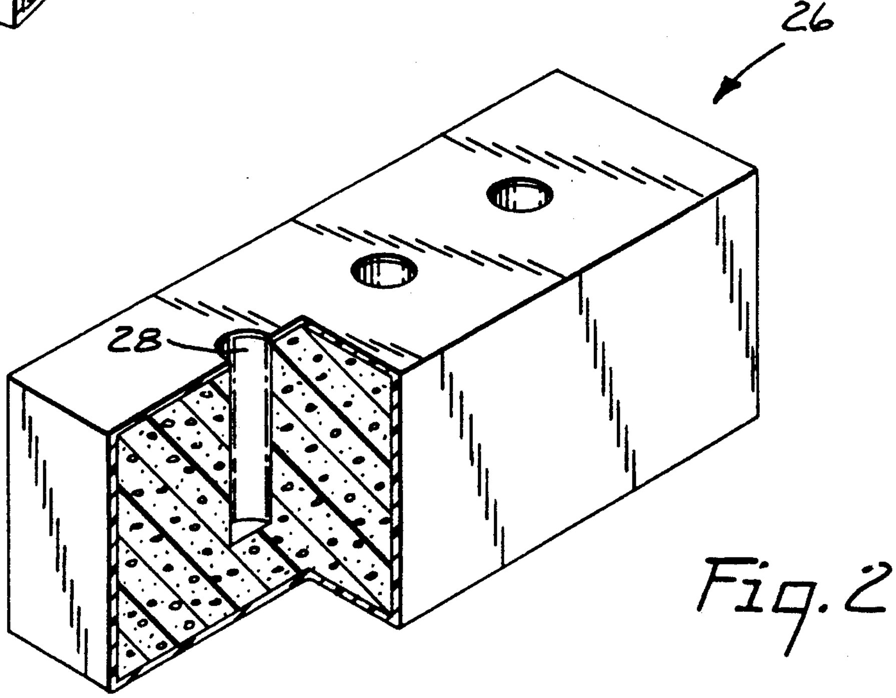
FIG. 2 is a perspective view of another container of the present invention.

FIG. 2 shows a container 26 of the invention adapted for storage of test tubes such a container is preferably molded as a block and then apertures 28 are drilled in the block for accommodating the test tubes.

Figure 3:
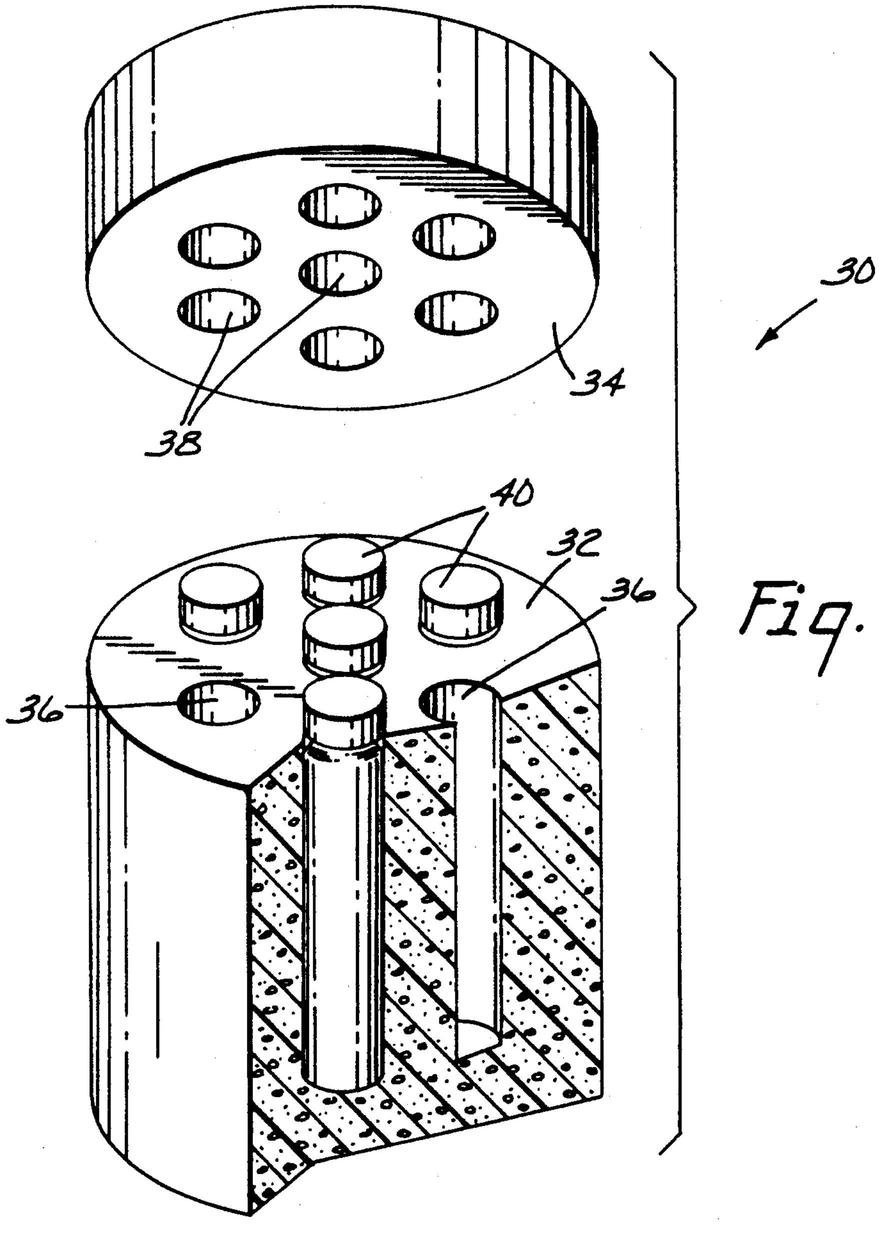
FIG. 3 is a perspective view of a further container of the present invention.

FIG. 3 shows a container 30 adapted for containing vials of hazardous liquid material. The container has a base 32 and a lid 34 of compressed polyolefin microfibers. Such a container is preferably molded as a block and base apertures 36 and lid apertures 38 are drilled into the block for accommodating vials 40.

The following examples further illustrate this invention, but the particular materials and amounts thereof in these examples, as well as the conditions and details, should not be construed to unduly limit this invention. In the examples, all parts and percentages are by weight unless otherwise specified.

The following test methods were used to characterize the molded materials of the invention:

Demand Sorbency Test

A 4.45 cm (1.75 inch) in diameter test sample of sorbent material was placed on a 25-50 micron porous plate in a filter funnel and a pressure of 1.0 KPa applied to the sample by a plunger which was freely movable in the barrel of the funnel. Deionized water at zero hydrostatic head was conducted from a reservoir through a siphon mechanism to the upper surface of the porous plate where the test sample sorbed the water. The initial lineal rate of absorbency was determined and reported in $l/m^2/min$

Equilibrium Sorption

A sample of sorbent material was placed in a bath of deionized water and allowed to saturate for 24 hours. The sample was then removed from the bath and placed on an open mesh screen for 10 minutes to allow for drainage of excess water. The amount of water sorbed by a unit volume of material was determined and the equilibrium sorption reported in $cm^3/cm^3$.

Centrifugal Retention Test

A sample of sorbent material, saturated to equilibrium (24 hr saturation time) with deionized water, was placed in a centrifuge tube which was in turn placed in a centrifuge and the sample subjected to a centrifugal force of 180 G for 10 minutes. The sample was removed from the centrifuge tube and the amount of water retained in the sample determined. Centrifugal retention values are reported in terms of the volume of water retained per unit volume of material ($cm^3/cm^3$).

Mechanical Properties—Tensile Strength

Dog-bone shaped test specimens are molded having a total surface area of 66.8 $cm^2$ and a test area of 25.5 $cm^2$. The molded test specimens (face width 2.5 cm; length 10.2 cm) were tested for maximum tensile strength using an Instron Tensile test unit. Evaluations were conducted using a X-head speed of 1.0 cm/min in accordance with ASTM F152- 86 Method C

Mechanical Properties—Compressive Stress/Strain Evaluations

Cylindrical specimens of 4.4 cm in diameter were subjected to compressive stress using a Instron test unit incorporating a compression load cell. The deflection of the specimen, for a given load, was recorded using a uniform loading rate up to an ultimate loading of 689.5 KPa. The X-head speed of the test unit during the evaluation was 1.0 cm/min. Strain energy of the test specimen was determined by calculating the area under the stress/strain curve and is reported in $KJ/m^3$.

Thermal Conductivity

Thermal conductivity analysis conducted under ASTM F-433 were performed on 5.1 cm diameter cylindrical specimens of 1.3 cm in height and are reported in cal/cm-sec-° C.

Impact Energy Density

The impact energy density was determined according to ASTM Test Method D-3331.

Cushioning Efficiency

The cushioning efficiency is determined as described in "Shook Control," Arimond, John, *Machine Design*, May 21, 1987. In this test, a 10 Kg weight is dropped from varying distances onto a given volume of material and the deceleration-time response is determined

Surface Area

Surface area determination were conducted using BET nitrogen adsorption method

Carbon Tetrachloride Vapor Adsorption

A sample of sorbent material, preconditioned at 100° C. in a convection oven for 4 hours, was placed in a sealed dissector containing carbon tetrachloride on a porous ceramic plate positioned about 2 cm above the level of the carbon tetrachloride Weight gain of the sample is determined gravimetrically after exposure to the vapor for 24 hours.

EXAMPLE 1

A melt blown microfiber web was prepared as described in Wente, Van A., "Superfine Thermoplastic Fibers," *Industrial Engineering Chemistry*, vol 48, pp.1342-1346 using polypropylene resin (Dypro TM 50 MFR, available from Fina Oil & Chemical Co.,). The fibers were sprayed with a surfactant solution (Aerosol TM OT, available from American Cyanamid Co ) at a rate to provide 2 percent surfactant based on the weight of the fibers. The microfibers were about 6 to 8 microns in average diameter. The web had a basis weight of 270 g/m$^2$, a density of $5.2\times10^{-2}$ g/cm$^3$, a solidity of 5.7%, and a void volume of 18.1 cm$^3$/g. The web was tested for sorbency properties. The results were demand sorbency: 4.95 l/m$^2$/min; equilibrium sorption 0.66 cm$^3$/cm $^3$; and centrifugal retention: 0.39 cm$^3$/cm$^3$.

The microfiber web was divellicated as described in U.S. Pat. No. 4,813,948 (Insley) which is incorporated herein by reference, using a lickerin having a tooth density of 6.2 teeth/cm$^2$ and a speed of 900 rpm to produce microfiber microwebs having an average nuclei diameter of 0.5 mm and an average microweb diameter of 1.3 mm.

The microfiber microwebs (587 g) were placed in a compression mold and compressed to form a cylindrical container having a solidity of 35%, an outside diameter of 14.2 cm, an inside diameter of 8.0 cm, and a height of 14.6 cm and top and bottom covers, each having a diameter of 14.2 cm and a thickness of 1.9 cm. A glass jar (0.47 L capacity) containing 460 cm$^3$ mineral oil was placed in the container, the covers were placed at the ends of the container, and the completed container was vacuum wrapped using 0.5 mm thick polyethylene film.

The container was tested for durability using the National Safe Transit Association Preshipment Drop Test Procedure Project 1A for package-products weighing under 100 pounds (45 kg) wherein the container was subjected to falls from up to sixty inches without breakage of the glass jar. The container was also subjected to drops onto concrete from a height of 30 feet without breakage of the glass jar.

The container without the top cover was tested for absorbency. The cavity of the container was filled with light mineral oil and the level maintained at the cavity top. At time intervals as set forth in Table 1, the oil was poured from the cavity, the container weighed, and then the cavity refilled with oil. The rate of oil sorption and equilibrium sorbency were determined. The data is set forth in Table 1.

TABLE 1

| Time (min) | Weight (g) | Oil sorbed (g) | Oil sored (cm$^3$) | Sorbency rate (l/m$^2$/min) | % Volume to saturation |
|---|---|---|---|---|---|
| 0 | 587 | — | — | — | — |
| 1 | 761 | 174 | 210 | 5.1 | 19 |
| 2 | 844 | 257 | 310 | 3.7 | 29 |
| 5 | 990 | 404 | 487 | 2.4 | 46 |
| 10 | 1155 | 568 | 684 | 1.7 | 64 |
| 15 | 1285 | 698 | 841 | 1.4 | 78 |
| 30 | 1374 | 786 | 947 | 0.8 | 87 |
| 60 | 1414 | 827 | 996 | 0.4 | 92 |
| 120 | 1433 | 846 | 1020 | 0.2 | 95 |
| 1440 | 1473 | 886 | 1070 | — | 100 |

As can be seen from the data in Table 1, the container had an excellent sorbency rate, sorbing close to 80% of its total capacity within fifteen minutes. The total sorption capacity of the container was about 1½ times the weight of the container.

EXAMPLES 2-46

In Examples 2-46, compressed particulate polyolefin microfiber materials suitable for use in the articles and containers of the present invention were prepared using the microfiber material and solidity indicated in Tables 2-4. Uncompressed microfiber microweb material A was prepared according to the procedures of Example 1. The web for microfiber material B was prepared according to to the procedures of Example 1. The web was then introduced into a hammer mill (Champion Chop n Throw TM Shreader, available from Champion Products, Inc., Eden Prairie, Minn.) operating at 500 rpm to produce highly milled microfiber particles 2 to 40 mm in size, predominantly about 10 mm in size Material C was flash spun polyethylene fiber having a diameter of about 1 to 5 microns and an average particle size of 1 to 6 mm (Tywick TM hazardous material pulp, available from New Pig Corp., Altoona, Pa.).

EXAMPLES 2-16

In Examples 2-16, the particulate polyolefin microfiber materials were compressed to form samples for tensile strength tests at nominal solidities of 30%, 40%, 50%, 60% and 70% using a hydraulic press to compress each sample. The compressed thickness, recovered thickness (60 min after removal from the press), actual solidity and tensile strength are reported in Table 2.

TABLE 2

| Example | Fiber | Fiber weight (g) | Compressed thickness (cm) | Recovered thickness (cm) | Actual solidity (%) | Tensile strength (KPa) |
|---|---|---|---|---|---|---|
| 2 | A | 29.4 | 1.1 | 1.7 | 29.0 | 9.0 |
| 3 | B | 29.3 | 1.1 | 1.7 | 28.5 | 9.0 |
| 4 | C | 29.6 | 0.9 | 1.7 | 28.8 | 5.5 |
| 5 | A | 29.5 | 0.9 | 1.2 | 38.7 | 46.2 |
| 6 | B | 29.6 | 0.9 | 1.2 | 38.8 | 51.0 |
| 7 | C | 29.3 | 0.8 | 1.2 | 39.2 | 22.1 |
| 8 | A | 30.0 | 0.8 | 1.0 | 50.7 | 303.5 |
| 9 | B | 29.4 | 0.7 | 1.0 | 49.7 | 158.6 |
| 10 | C | 29.3 | 0.7 | 1.0 | 49.5 | 75.9 |
| 11 | A | 46.7 | 1.0 | 1.3 | 58.8 | 510.3 |
| 12 | B | 46.5 | 1.0 | 1.3 | 58.5 | 482.8 |
| 13 | C | 46.0 | 1.0 | 1.3 | 59.1 | 193.1 |
| 14 | A | 54.5 | 1.1 | 1.3 | 68.6 | 1034.5 |
| 15 | B | 54.2 | 1.0 | 1.3 | 69.6 | 965.5 |
| 16 | C | 54.2 | 1.0 | 1.3 | 69.5 | 310.3 |

As can be seen from the data in Table 2, increasing the solidity of the compressed polyolefin microfiber samples increased the tensile strength of the samples.

EXAMPLES 17-31

In Examples 17-31, the particles of polyolefin microfiber were compressed to form samples for compression tests at nominal solidities of 30%, 40%, 50%, 60% and 70% using a hydraulic press to compress each sample. The compressed thickness, recovered thickness (60 min after removal from the press), actual solidity and strain energy are reported in Table 3.

TABLE 3

| Example | Fiber | Fiber weight (g) | Compressed thickness (cm) | Recovered thickness (cm) | Actual solidity (%) | Strain energy (KJ/m$^3$) |
|---|---|---|---|---|---|---|
| 17 | A | 27.7 | 4.4 | 7.0 | 27.8 | 67.4 |
| 18 | B | 27.7 | 4.4 | 7.0 | 27.7 | 66.2 |
| 19 | C | 27.6 | 3.5 | 6.8 | 28.3 | 76.1 |
| 20 | A | 27.5 | 3.5 | 4.9 | 39.3 | 40.1 |
| 21 | B | 27.7 | 3.5 | 5.2 | 37.4 | 50.0 |
| 22 | C | 27.6 | 3.0 | 4.8 | 40.6 | 47.3 |
| 23 | A | 27.6 | 3.0 | 3.9 | 49.1 | 35.6 |
| 24 | B | 27.7 | 2.7 | 3.7 | 51.8 | 20.1 |
| 25 | C | 27.9 | 2.7 | 3.8 | 51.3 | 52.2 |
| 26 | A | 27.8 | 2.7 | 3.4 | 57.2 | 17.4 |
| 27 | B | 27.7 | 2.5 | 3.1 | 61.8 | 11.7 |
| 28 | C | 27.9 | 2.5 | 3.3 | 59.0 | 33.0 |
| 29 | A | 27.8 | 2.3 | 2.8 | 70.4 | 5.3 |
| 30 | B | 27.7 | 2.3 | 2.8 | 69.4 | <5.0 |
| 31 | C | 27.7 | 2.3 | 2.9 | 67.3 | 22.6 |

As can be seen from the data in Table 3, as the solidity of the compressed particles of polyolefin microfibers increases, the strain energy decreases, indicating that as the void volume is reduced the material becomes more rigid.

EXAMPLES 32-46

In Examples 32-46, the particles of polyolefin microfiber materials were compressed to form samples for sorbency and retention tests at nominal solidities of 30%, 40%, 50%, 60% and 70% using a hydraulic press to compress each sample. The fiber weight, compressed thickness, recovered thickness (60 min after removal from the press), and actual solidity are reported in Table 4. The equilibrium sorption, demand sorbency and centrifugal retention values for Examples 32-46 are reported in Table 5.

TABLE 4

| Example | Fiber | Fiber weight (g) | Compressed thickness (cm) | Recovered thickness (cm) | Actual solidity (%) |
|---|---|---|---|---|---|
| 32 | A | 27.5 | 4.4 | 7.1 | 27.2 |
| 33 | B | 29.9 | 4.4 | 7.7 | 27.4 |
| 34 | C | 28.1 | 3.5 | 6.7 | 29.5 |
| 35 | A | 27.8 | 3.5 | 4.9 | 39.8 |
| 36 | B | 30.0 | 3.5 | 5.2 | 40.5 |
| 37 | C | 28.0 | 3.0 | 4.8 | 40.9 |
| 38 | A | 27.8 | 3.0 | 3.9 | 50.0 |
| 39 | B | 30.1 | 3.0 | 4.0 | 52.8 |
| 40 | C | 27.8 | 2.7 | 3.9 | 50.6 |
| 41 | A | 27.7 | 2.7 | 3.3 | 58.9 |
| 42 | B | 30.1 | 2.7 | 3.5 | 61.1 |
| 43 | C | 27.2 | 2.5 | 3.2 | 59.7 |
| 44 | A | 28.0 | 2.3 | 2.8 | 71.3 |
| 45 | B | 27.5 | 2.3 | 2.7 | 71.5 |
| 46 | C | 27.7 | 2.3 | 2.8 | 69.5 |

TABLE 5

| Example | Equilibrium sorption (cm$^3$/cm$^3$) | Demand sorbency (l/m$^2$min) | Centrifugal retention (cm$^3$/cm$^3$) |
|---|---|---|---|
| 32 | 1.02 | 5.47 | 0.24 |
| 33 | 0.88 | 5.73 | 0.22 |
| 34 | 1.01 | 5.54 | 0.20 |
| 35 | 0.64 | 2.38 | 0.18 |
| 36 | 0.61 | 3.16 | 0.20 |
| 37 | 0.84 | 3.09 | 0.24 |
| 38 | 0.48 | 1.87 | 0.19 |
| 39 | 0.48 | 1.48 | 0.20 |
| 40 | 0.62 | 1.48 | 0.28 |
| 41 | 0.37 | 1.35 | 0.20 |
| 42 | 0.32 | 0.90 | 0.18 |
| 43 | 0.52 | 1.00 | 0.27 |
| 44 | 0.24 | 0.84 | 0.19 |
| 45 | 0.28 | 0.52 | 0.19 |
| 46 | 0.35 | 0.19 | 0.26 |

The data in Tables 4 and 5 demonstrate that as void volume is reduced in the molded material a reduction in both equilibrium sorbency and demand sorbency is experienced Centrifugal retention is maintained essentially the same regardless of solidity indicating that the effective surface area of the materials is not reduced with densification.

EXAMPLES 47-50 AND COMPARATIVE EXAMPLES C1 and C2

In Examples 47-50, a melt blown microfiber web was prepared and divellicated as in Example 1 to form microfiber microwebs. Portions of the microfiber microwebs were molded under varying amounts of pressure as set forth in Table 6. The resulting compressed polyolefin microfiber materials were characterized and tested for equilibrium sorption with light mineral oil together with a sample of the melt blown microfiber web prior to divellication (Comparative Example C1) and a sample of the microfiber microwebs prior to compression (Comparative Example C2). The results are set forth in Table 6.

TABLE 6

| Example | Fiber weight (g) | Molding pressure (MPa) | Recovered thickness (cm) | Actual solidity (%) | Equilibrium sorbency (cm$^3$/cm$^3$) |
|---|---|---|---|---|---|
| C1 | — | — | — | 10.9 | 0.83 |
| C2 | — | — | — | 9.8 | 1.25 |
| 47 | 16.6 | 2.1 | 3.5 | 24.4 | 1.02 |
| 48 | 15.4 | 4.2 | 2.1 | 37.7 | 0.94 |
| 49 | 11.2 | 8.4 | 0.9 | 63.6 | 0.65 |
| 50 | 21.9 | 21.0 | 1.3 | 86.3 | 0.31 |

As can be seen from the data in Table 6, as the molding pressure increases, the solidity increases and the equilibrium sorbency decreases.

EXAMPLES 51-53

In Examples 51-53, compressed polyolefin microfiber particles were prepared as in Examples 48-50, characterized and tested for equilibrium sorption with water. The results are set forth in Table 7.

TABLE 7

| Example | Fiber weight (g) | Molding pressure (MPa) | Recovered thickness (cm) | Actual solidity (%) | Equilibrium sorbency (cm$^3$/cm$^3$) |
|---|---|---|---|---|---|
| 51 | 15.2 | 4.2 | 1.7 | 45.8 | 0.68 |
| 52 | 16.3 | 8.4 | 1.5 | 55.7 | 0.42 |

TABLE 7-continued

| Example | Fiber weight (g) | Molding pressure (MPa) | Recovered thickness (cm) | Actual solidity (%) | Equilibrium sorbency ($cm^3/cm^3$) |
|---|---|---|---|---|---|
| 53 | 17.6 | 21.0 | 1.2 | 75.4 | 0.21 |

As can be seen from the data in Table 7, as the molding pressure increases, the solidity increases and the equilibrium sorbency decreases.

EXAMPLES 56–58 AND COMPARATIVE EXAMPLES C3–C6

In Examples 56–58, compressed polyolefin microfiber materials were prepared using fiber materials A, B, and C as described with regard to Examples 2–46 at a nominal solidity of 40%. The compressed thickness, recovered thickness, actual solidity are set forth in Table 8. The materials of each of Examples 56–58 were tested for cushion efficiency. The impact energy density, peak acceleration and cushion efficiency are set forth in Table 9. The impact energy density and cushion efficiency reported for various foam materials in U.S. Pat. No. 4,584,822 including a urethane ester foam (Comparative Example C3), a polystyrene foam (Comparative Example C4), a polyethylene foam (Comparative Example C5), and a low density polyurethane foam (Comparative Example C6) are also reported in Table 9.

TABLE 8

| Example | Fiber | Fiber weight (g) | Compressed thickness (cm) | Recovered thickness (cm) | Actual solidity (%) |
|---|---|---|---|---|---|
| 56 | A | 27.8 | 3.5 | 5.2 | 37.4 |
| 57 | B | 27.8 | 3.5 | 5.5 | 35.2 |
| 58 | C | 27.7 | 3.0 | 4.9 | 39.8 |

TABLE 9

| Example | Impact energy density ($KJ/m^3$) | Peak deceleration (g's) | Cushion efficiency (J) |
|---|---|---|---|
| 56 | 117 | 8.5 | 4 |
| | 234 | 18 | 4.5 |
| | 352 | 30 | 5 |
| 57 | 110 | 6.6 | 3.5 |
| | 221 | 17 | 4.5 |
| | 331 | 25 | 4.5 |
| 58 | 131 | 8 | 4 |
| | 255 | 17 | 4 |
| | 386 | 30 | 5 |
| C3 | 117 | — | 8.3 |
| C4 | 117 | — | 6 |
| C5 | 117 | — | 5 |
| C6 | 117 | — | 3.5 |

As can be seen from the data in Table 9, the materials of the invention provided better cushioning efficiency than did the comparative foam materials, except the low density polyurethane foam Although each of the foam materials of Comparative Examples C3–C6 provides some cushioning effect, each of the materials is substantially non-absorbent.

EXAMPLE 59

A cylindrical container was prepared as in Example 1. The bottom cover was placed on the cylinder and a 0.5 mm thick layer of polyethylene was applied to the outer surface to unify the cylinder and cover and to provide a liquid barrier. Liquid nitrogen was charged into the open container until 450 g was imbibed and a thermocouple was placed in the open cavity. The liquid nitrogen imbibed container was placed in a secondary container of styrofoam having a wall thickness of 2.5 cm at an ambient room temperature of 21° C. The container was inverted after imbibation to allow any free liquid nitrogen to escape. In the inverted position, the temperature of the open cavity of the container was monitored with ambient room temperature maintained at 21° C. The resulting temperatures are set forth in Table 10.

TABLE 10

| Time (hrs) | Temperature (°C.) |
|---|---|
| 0 | −189 |
| 1 | −191 |
| 2 | −195 |
| 3 | −192 |
| 4 | −125 |
| 5 | −80 |
| 6 | −49 |
| 7 | −27 |
| 8 | −14 |
| 9 | −3 |
| 10 | +1 |

As can be seen from the data in Table 10, the nitrogen remained imbibed in the container walls until it boiled off, maintaining its initial temperature for at least three hours.

EXAMPLE 61 AND COMPARATIVE EXAMPLES C7 AND C8

A microfiber web was prepared as described in U.S. Pat. No. 3,971,373 (Braun) which is incorporated herein by reference, having a total basis weight of 200 $g/m^2$ and containing 60 weight percent activated carbon (PCB 30×140, available from Calgon Corp.) and 40 weight percent microfibers melt blown using polypropylene resin (Dypro TM 50 MFR). The web was divellicated as described in Example 1 to form microfiber microwebs. The microwebs (23 g) were then compressed under 8.4 MPa pressure in a 5.1 cm diameter mold to produce material 5.2 cm in diameter, 2.2 cm thick and having a solidity of 32% when calculated according to the formula.

$$\text{Solidity} = \frac{\text{molded article density}}{\text{(carbon density)(weight fraction carbon)} + \text{(polypropylene density)(polypropylene weight fraction)}} \times 100$$

This molded material was then tested for carbon tetrachloride uptake capacity. Also tested were a sample of activated carbon (Comparative Example C7) and a sample of molded material containing no activated carbon prepared according to the procedure of Example 26 (Comparative Example C8) using 27.4 g microfiber microwebs to obtain material 2.7 cm thick, 4.5 cm in diameter, and having a solidity of 57%. The results are set forth in Table 11.

TABLE 11

| Example | Sorbed weight (g) | Amount sorbed (g) | Sorption ratio (g/g) | Carbon sorption ratio (g/g) |
|---|---|---|---|---|
| 60 | 31.5 | 8.5 | 0.37 | 0.62 |
| C7 | 19.5 | 7.0 | 0.55 | 0.55 |

TABLE 11-continued

| Example | Sorbed weight (g) | Amount sorbed (g) | Sorption ratio (g/g) | Carbon sorption ratio (g/g) |
|---|---|---|---|---|
| C8 | 27.5 | 0.1 | 0.004 | — |

As can be seen from the data in Table 11, the activated carbon retains sorptive effectiveness when loaded into a microfiber web which is then divellicated and molded. This retention of effectiveness is a result of the open pore structure of the microfiber component and the availability of activated carbon sorption surfaces even after molding.

EXAMPLE 61

Compressed polyolefin microfiber particulate material was prepared as in Example 32 and tested for thermal conductivity. The thermal conductivity was $1.5\times10^{-4}$ cal/cm-sec-° C. at a temperature of 76° C.

EXAMPLE 62

Compressed polyolefin microfiber particulate material was prepared as in Example 44 and analyzed for surface area. The surface area was 1.54 $m^2/g$. The surface area of the microfiber web used to prepare the microfiber microwebs was also analyzed for surface area which was found to be about 1.2 $m^2/g$. That the surface area of the compressed polyolefin microfiber material was not significantly different from that of the microfiber web tends to indicate that substantially no fiber bonding occurred during the molding process.

The various modifications and alterations of this invention will be apparent to those skilled in the art without departing from the scope and spirit of this invention and this invention should not be restricted to that set forth herein for illustrative purposes.

I claim:

1. A process for preparing an article comprising the steps of
   i) divellicating or milling a polyolefin microfiber web to provide particles of polyolefin microfibers,
   ii) providing said particles to a mold,
   iii) applying pressure to said microfibers,
   iv) releasing said pressure, and
   v) removing said article from said mold, said pressure being sufficient to achieve a solidity of at least about 20% when said pressure is released.

2. The process of claim 1 wherein said pressure is in the range of about 2 to 25 MPa.

3. A process for preparing a container for storing or shipping hazardous liquid materials comprising the steps of
   i) divellicating or milling a polyolefin microfiber web to provide particles of polyolefin microfibers,
   ii) providing said particles to a mold,
   iii) applying pressure to said microfibers to form said container,
   iv) releasing said pressure, and
   v) removing said container from said mold, said pressure being sufficient to achieve a solidity of at least about 20% when said pressure is released 4. The process of claim 3 wherein said pressure is in the range of about 2 to 25 MPa.

5. The process of claim 3 wherein said particles are microfiber microwebs.

6. The process of claim 5 wherein said pressure is in the range of about 5 to 10 MPa.

* * * * *

UNITED STATES PATENT AND TRADEMARK OFFICE

CERTIFICATE OF CORRECTION

PATENT NO. 5,219,504

DATED June 15, 1993

INVENTOR(S) Thomas I. Insley

It is certified that error appears in the above-indentified patent and that said Letters Patent is hereby corrected as shown below:

| | |
|---|---|
| Col. 2, line 21 | "etc as" should read --etc. as-- |
| Col. 3, line 15 | "granules The" should read --granules. The-- |
| Col. 3, line 22 | "service Two" should read --service. Two-- |
| Col. 6, line 18 | "sorbency The" should read --sorbency. The-- |
| Col. 7, line 7 | "Company Other" should read --Company. Other-- |
| Col. 7, line 43 | "14 A" should read -- 14. A-- |
| Col. 7, line 47 | "tubes such" should read --tubes. Such-- |
| Col. 8, line 37 | "C" should read --C.-- |
| Col. 8, line 65 | ""Shook" should read --"Shock-- |
| Col. 8, line 68 | "determined" should read --determined.-- |
| Col. 9, line 24 | "Co)" should read --Co.)-- |
| Col. 10, line 35 | "size Mate" should read --size. Mate-- |

UNITED STATES PATENT AND TRADEMARK OFFICE

CERTIFICATE OF CORRECTION

PATENT NO. : 5,219,504

DATED : June 15, 1993

INVENTOR(S) : Thomas I. Insley

It is certified that error appears in the above-indentified patent and that said Letters Patent is hereby corrected as shown below:

Col. 12, line 23 "experienced Centrifugal" should read --experienced. Centrifugal--

Col. 13, line 58 "foam Although" should read --foam. Although--

Signed and Sealed this

Twenty-second Day of March, 1994

Attest:

Bruce Lehman

BRUCE LEHMAN

*Attesting Officer*

*Commissioner of Patents and Trademarks*